US012705393B2

(12) United States Patent
Hammel

(10) Patent No.: US 12,705,393 B2
(45) **Date of Patent: *Aug. 11, 2026**

(54) SYSTEM AND PROCESS FOR LOCATION-BASED ANONYMITY AND PRIVACY

(71) Applicant: Balcony Labs, Inc., Sunnyvale, CA (US)

(72) Inventor: David Eli Hammel, Sunnyvale, CA (US)

(73) Assignee: Balcony Labs, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/676,402

(22) Filed: May 28, 2024

(65) Prior Publication Data

US 2025/0131127 A1 Apr. 24, 2025

Related U.S. Application Data

(63) Continuation of application No. 17/600,025, filed as application No. PCT/US2021/018264 on Feb. 16, 2021, now Pat. No. 11,995,212.

(60) Provisional application No. 62/976,403, filed on Feb. 14, 2020.

(51) Int. Cl.
*G06F 21/62* (2013.01)
*H04W 12/02* (2009.01)

(52) U.S. Cl.
CPC ........ *G06F 21/6254* (2013.01); *H04W 12/02* (2013.01)

(58) Field of Classification Search
CPC ........................... G06F 21/6254; H04W 12/02
See application file for complete search history.

(56) References Cited

U.S. PATENT DOCUMENTS

| | | | | |
|---|---|---|---|---|
| 10,936,712 | B1 * | 3/2021 | Li | G06Q 10/40 |
| 11,244,367 | B2 * | 2/2022 | Barday | G06Q 30/0609 |
| 2021/0042854 | A1 * | 2/2021 | Hazy | G06Q 10/40 |
| 2021/0084077 | A1 * | 3/2021 | Brannon | H04L 63/20 |
| 2021/0112103 | A1 * | 4/2021 | Brannon | H04L 63/20 |
| 2021/0117574 | A1 * | 4/2021 | Abel | G06F 21/6245 |
| 2021/0125120 | A1 * | 4/2021 | Brannon | G06F 21/6245 |
| 2021/0176201 | A1 * | 6/2021 | Le Jouan | H04L 51/48 |
| 2021/0182111 | A1 * | 6/2021 | Jakobsson | G06F 9/5055 |
| 2021/0217106 | A1 * | 7/2021 | Hauser | H04L 67/306 |

(Continued)

*Primary Examiner* — Stephen T Gundry

(74) *Attorney, Agent, or Firm* — FisherBroyles, LLP; Thomas J. Osborne, Jr.

(57) ABSTRACT

Implementations of enhancing privacy and anonymity for users of a computer system are provided. For example, selective anonymity for one or more users may be provided in which the one or more users may be anonymous or not, with various degrees of anonymity in between. A “vault” or other information repository may be used to save information (e.g., all information retained, all or a portion of privacy-related or personally-identifiable information) about a user that can be accessed by the user to see, reset, and or delete all or a portion of the information that is saved on the system. Further, “last known location” information may be kept, such that, in some implementations, the last known location (or a limited number of most recent locations) of a user may be kept such that historical information and/or a route of a user is not stored on the system.

20 Claims, 8 Drawing Sheets

(56) References Cited

U.S. PATENT DOCUMENTS

| | | | | |
|---|---|---|---|---|
| 2021/0286868 | A1* | 9/2021 | Kragh | H04L 9/3247 |
| 2021/0344720 | A1* | 11/2021 | Barday | H04L 63/04 |
| 2021/0390470 | A1* | 12/2021 | Clearwater | G06Q 10/0635 |
| 2021/0406400 | A1* | 12/2021 | Tawakol | G06Q 30/0251 |
| 2022/0012364 | A1* | 1/2022 | LaFever | H04L 63/0407 |
| 2022/0035931 | A1* | 2/2022 | Fourman | G06F 21/60 |
| 2022/0291812 | A1* | 9/2022 | Amitay | H04W 4/029 |
| 2022/0311730 | A1* | 9/2022 | Le Jouan | H04L 67/02 |
| 2022/0414418 | A1* | 12/2022 | Ruck | G06Q 30/0621 |
| 2023/0004676 | A1* | 1/2023 | Falchuk | G06F 3/04815 |
| 2023/0047653 | A1* | 2/2023 | Beaumont | G06F 21/552 |
| 2023/0054446 | A1* | 2/2023 | LaFever | H04W 12/75 |

* cited by examiner

Example of possible levels of anonymity

Example of Anonymity management screen for the individual mobile user

Opt in affiliation or tagging code
(i'm a medic, an IT professional, I have Asthma, ...)

Opt in provision of name or nickname to be shown in areas where anonymity is lifted off (Campus for example)

Enter your vault - see what info the system saved about you. Delete, reset or acknowledge Determine a Rough order of magnitude of user locations

SYSTEM AND PROCESS FOR LOCATION-BASED ANONYMITY AND PRIVACY

CROSS-REFERENCE TO RELATED APPLICATIONS

This application is a continuing application of U.S. patent application Ser. No. 17/600,025 entitled "System and Process for Location-Based Anonymity and Privacy" filed on Sep. 29, 2021, which is a US national stage application of PCT/US2021/018264 entitled "System and Process for Location-Based Anonymity and Privacy" filed on Feb. 16, 2021. This application also claims the benefit of U.S. provisional application No. 62/976,403 entitled "SYSTEM AND PROCESS FOR LOCATION-BASED COMMUNICATION AND INFORMATION RETRIEVAL" filed on Feb. 14, 2020. Each of the above-referenced applications are incorporated by reference in their entirety as though fully set forth herein.

This application is related to U.S. Pat. No. 9,918,319 entitled "System and Process for Location-Based Information Retrieval" and issued on Mar. 13, 2018, which is incorporated by reference in its entirety as though fully set forth herein.

BACKGROUND

Field

The instant disclosure relates to privacy and anonymity in location-based systems and processes for receiving information requests.

Background

Electronic communications systems exist in which computing devices, such as mobile computing devices, are able to communicate with other computing devices when contact information is known for the other computing device. However, when contact information is not available, typical crowd-sourcing applications transmit information to a broad group of recipients and not to a narrower, targeted subset of computing devices that are determined to be relevant to a particular request.

BRIEF SUMMARY

Various implementations of enhancing privacy and anonymity for users of a computer system are provided. For example, selective anonymity for one or more users may be provided in which the one or more users may be anonymous or not, with various degrees of anonymity in between. A "vault" or other information repository may be used to save information (e.g., all information retained, all or a portion of privacy-related or personally-identifiable information) about a user that can be accessed by the user to see, reset, and or delete all or a portion of the information that is saved on the system. Further, "last known location" information may be kept, such that, in some implementations, the last known location (or a limited number of most recent locations) of a user may be kept such that historical information and/or a route of a user is not stored on the system.

In one implementation, for example, the system may define one or more regions on a map, such as a polygon, by a decision maker, stake holder, or automatically. For example, in some implementations, the region may include a corporate campus on which locations of certain device(s) associated with user(s) (e.g., employees) may be tracked for security or other purposes.

In this implementation, a user may have selective anonymity with respect to locations and/or other information (identity, personally-identifiable information, etc.) outside the one or more regions (or vice versa). Further, users may provide any private information (or semi-private information such as a nickname or avatar) that can be saved and/or tracked within the one or more regions, but not outside the one or more regions (or vice versa). Thus, when the device/user is outside a controlled region, the system may be configured to not track the user(s) and/or device(s) such that the user(s)/device(s) cannot be seen on a map, can be seen as part of a heat map, density map, or other type of map without personally-identifiable information. In one implementation, for example, the user(s)/device(s) may be shown as a dot or icon. In this particular example, the user(s)/device(s) may be seen and/or tracked while within the region(s), but not outside the region(s). The user(s)/device(s) may further be invisible to the system in some implementations such that the system does not track or identify them. The system, in this implementation, may not be able to communicate with them or may have limited functionalities (e.g., users without access/permission may not see them or otherwise see/access information about them), while only limited users with controlled access/permission may have access to some or all location, privacy and/or personally-identifiable information.

When a user/device enters the region, the system can be configured to reveal information (e.g., personally-identifiable information) about the user/device. For example, the system may reveal some or all of a name, an icon (e.g., a unique icon for the user/device), picture, proficiency, specialty, special status (e.g., sick, on leave, etc.), and one or more status identifiers for the user/device that are relevant at the time. In one implementation, for example, the system may include a school security system. At school (e.g., on campus) within the region (e.g., a defined polygon region), students may be shown as children with identifiable name tags as long as they are on the campus within the region. Once outside the region (e.g., off campus), the children are no longer identifiable and may be totally anonymous or not displayed on the map or system at all. Similarly, for an amusement park or other venue, many features of a system may be available to one or more users/devices as long as a user/device is physically located within the defined region (e.g., within the venue). However, once the user/device is outside the venue region (e.g., polygon), a status associated with the user/device can be changed to inactive (e.g., ex visitor) with a different set of data provided (e.g., anonymous, no ad targeting, no tracking, etc.). In yet another implementation, a corporate security system may identify users/devices of personnel working for a corporation. When the users/devices are within a region (e.g., polygon) corresponding to a corporate campus, security officers of the corporation can monitor the campus and see information related to the users/devices. For example, the system may show security officers (or others with permission/access) personally identifiable information identifying employees, contractors, visitors, etc. while on the campus within the defined region. However, when the users/devices are off-campus outside the region, the users/devices may be eliminated from tracking altogether or only displayed without personally-identifiable information (e.g., as a dot or other icon, as part of a heat map, or as part of a density map, etc.

The foregoing and other aspects, features, details, utilities, and advantages of the present invention will be apparent from reading the following description and claims, and from reviewing the accompanying drawings.

DETAILED DESCRIPTION

Figure 1:
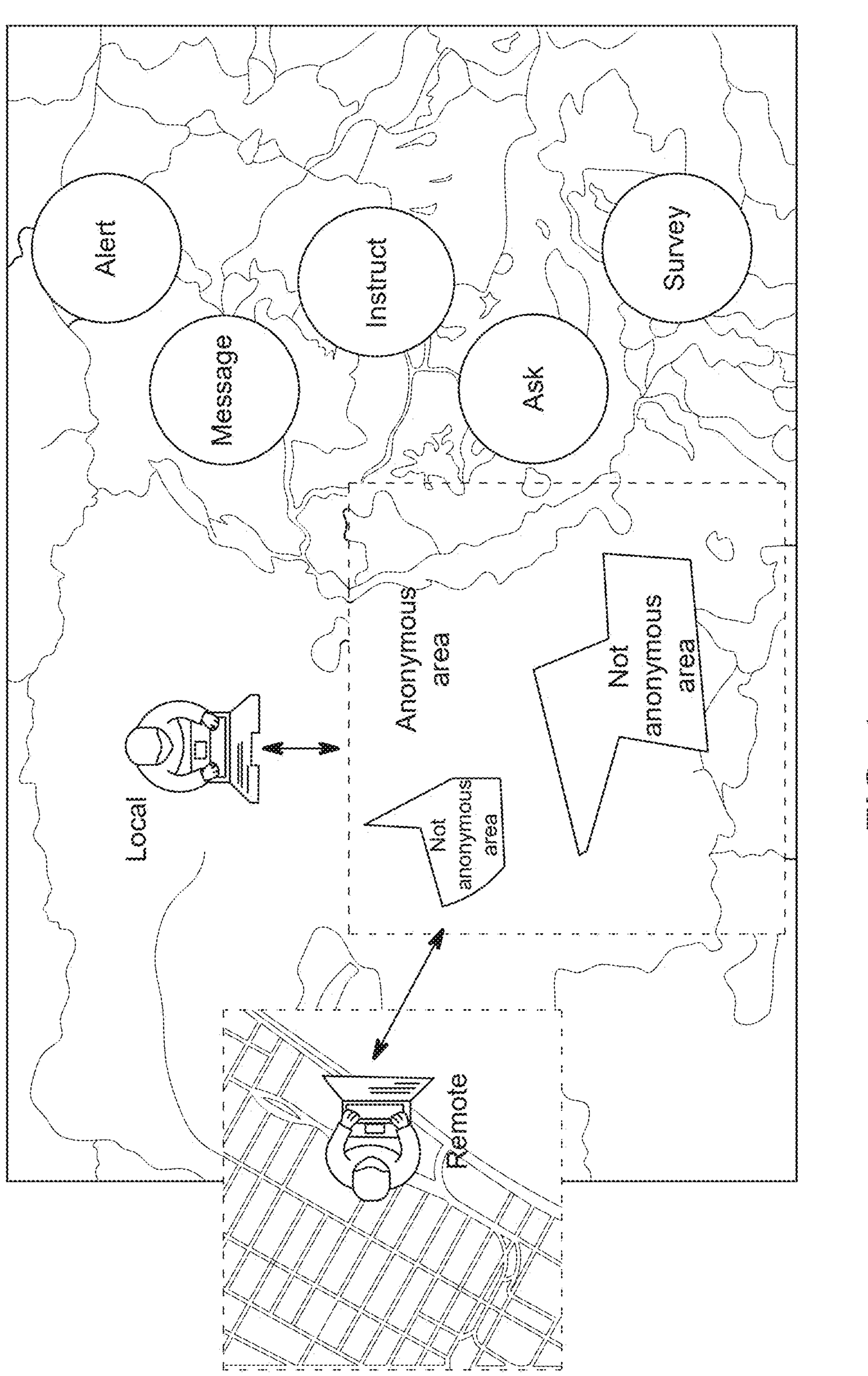
FIG. 1 is an illustration showing an example view of a display of a selective anonymity system in which areas of the display correspond to anonymous and non-anonymous areas.

Various implementations of enhancing privacy and anonymity for users of a computer system are provided. For example, selective anonymity for one or more users may be provided in which the one or more users may be anonymous or not, with various degrees of anonymity in between. A "vault" or other information repository may be used to save information (e.g., all information retained, all or a portion of privacy-related or personally-identifiable information) about a user that can be accessed by the user to see, reset, and or delete all or a portion of the information that is saved on the system. Further, "last known location" information may be kept, such that, in some implementations, the last known location (or a limited number of most recent locations) of a user may be kept such that historical information and/or a route of a user is not stored on the system.

Anonymity, as used herein, refers to a type of privacy in which an identity of a user and/or device is limited, at least in part, from one or more other users, from the system, etc. In various implementations provided herein, where anonymity is described other privacy concerns may or may not also be addressed. Similarly, where privacy is described, anonymity may or may not be included in specific implementations.

In one implementation, for example, the system may define one or more region on a map, such as a polygon or other shape region, by a decision maker, stake holder, or automatically. For example, in some implementations, the region may include a corporate campus on which locations of certain device(s) associated with user(s) (e.g., employees) may be tracked for security or other purposes.

In this implementation, a user may have selective anonymity with respect to locations and/or other information (identity, personally-identifiable information, etc.) outside the one or more regions (or vice versa). Further, users may provide any private information (or semi-private information such as a nickname or avatar) that can be saved and/or tracked within the one or more regions, but not outside the one or more regions. Thus, when the device/user is outside a controlled region, the system may be configured to not track the user(s) and/or device(s) such that the user(s)/device(s) cannot be seen on a map, can be seen as part of a heat map, density map, or other type of map without personally-identifiable information. In one implementation, for example, the user(s)/device(s) may be shown as a dot or icon. In this particular example, the user(s)/device(s) may be seen and/or tracked while within the region(s), but not outside the region(s). The user(s)/device(s) may further be invisible to the system in some implementations such that the system does not track or identify them. The system, in this implementation, may not be able to communicate with them or may have limited functionalities (e.g., users without access/permission may not see them or otherwise see/access information about them), while only limited users with controlled access/permission may have access to some or all location, privacy and/or personally-identifiable information.

When a user/device enters the region, the system can be configured to reveal information (e.g., personally-identifiable information) about the user/device. For example, the system may reveal some or all of a name, an icon (e.g., a unique icon for the user/device), proficiency, specialty, special status (e.g., sick, on leave, etc.), and one or more status identifiers for the user/device that are relevant at the time. In one implementation, for example, the system may include a school security system. At school (e.g., on campus) within the region (e.g., a defined polygon region), students may be shown as children with identifiable name tags as long as they are on the campus within the region. Once outside the region (e.g., off campus), the children are no longer identifiable and may be totally anonymous. Similarly, for an amusement park or other venue, many features of a system may be available to one or more users/devices as long as a user/device is physically located within the defined region (e.g., within the venue). However, once the user/device is outside the venue region (e.g., polygon), a status associated with the user/device can be changed to inactive (e.g., ex visitor) with a different set of data provided (e.g., anonymous, no ad targeting, no tracking, etc.). In yet another implementation, a corporate security system may identify users/devices of personnel working for a corporation. When the users/devices are within a region (e.g., polygon) corresponding to a corporate campus, security officers of the corporation can monitor the campus and see information related to the users/devices. For example, the system may show security officers (or others with permission/access) personally identifiable information identifying employees, contractors, visitors, etc. while on the campus within the defined region. However, when the users/devices are off-campus outside the region, the users/devices may be eliminated from tracking altogether or only displayed without personally-identifiable information (e.g., as a dot or other icon, as part of a heat map, or as part of a density map, etc.

In various implementations, the level of anonymity may be determined by the system, administrators of the system, and/or by the users themselves. The user can, for example, opt out or opt into anonymity at any moment. Similarly, the level of anonymity may be a function of one or more events (e.g., in an emergency) where one or more specialized users is to be identified (e.g., identify medics or other healthcare personnel during a medical emergency, security guards or police officers during a security incident such as a break-in, etc.). An external emergency such as an earthquake, volcanic eruption, tornado, etc. may trigger an emergency event that similarly removes anonymity of individuals to help with identification and providing assistance moving users to safety or providing an account of users that may be within a danger zone. Stepping out or into anonymity can be automatic (e.g., physically enter defined region) or semi-automatic in which a user is prompted to step out of anonymity. Anonymity can also be time-sensitive (e.g., users identifiable or non-anonymous only during daytime/business hours and anonymous outside daytime/business hours).

In some implementations, anonymity can have multiple levels, such as the following:

a. No one knows where a particular user is;
b. Only the system knows where the user is, but the user is not shown on a map or other display;
c. Some or all people with access can see an non-personally identifiable identifier (e.g., a dot or generic icon) but cannot identify a particular user;
d. Basic information is shown (e.g., proficiency, organization, etc.) although no name or other personally-identifiable information is shown;
e. An avatar is shown;
f. A name is shown on a pin/icon; and/or
g. An image is shown.

In some implementations, a map display can show a level of anonymity that can be defined as a function of the zoom on the map. For example, a medic can be shown in a general area of the map, but when the map is zoomed, the medic (or other user) can be eliminated from the map or the map may turn into a 'density map' so that users cannot identify the actual location (e.g., residence) of the medic or other identified user. Identification of users on a map display may also be defined as a function of a number of relevant users. For example, if a user is a single or one of a few users in a relevant region, the system may keep the user(s) completely anonymous. Once there are a number of users above a predefined threshold (e.g., a set number or geographical density), however, the system can share more or less information about individual or groups of users.

Information about users can be stored in various manners in different implementations. For example, information about a user can be stored on a portable device (e.g., a smartphone) but not on a system device such as a server. In other examples, information can be stored on a server, but with limited access to humans and can be displayed in limited fashion such as described herein. The information can also be stored on a server temporarily while a user/device is within a predefined region, but deleted each time the user/device exits the predefined region. In other examples, the information can be stored on and synced between the portable device and a server or the information can be stored solely on the server. In yet another example, the information may be stored using blockchain technology.

The system may also provide communication with a user. For example, the communication may include: a process of stepping into and out of anonymity that is transparent to the user; identifying a status (e.g., via an icon displayed on the user's device) that identifies whether the user is anonymous or not at that particular moment; providing an option for the user to select to opt in or out of anonymity at any particular moment; and/or providing the user a timer in which the user can choose whether to opt into or out of anonymity (e.g., if you don't opt out within a predetermined time window after entering a defined region, you will step out of anonymity and your identity will be revealed).

In various implementations, various individuals may be able to access identity or other user information. For example, in some implementations, contacts of a user may be able to access the information, an organization to which the user is assigned may have access, only direct management of a user may have access, decision makers of an organization may have access, any type of entity may have access, marketing advertisement companies may have access, and/or the general public may have access.

In various implementations, the phone can actually go 'offline' stopping any communication with the Server until it walks out of, or into a region (e.g., polygon) where it changes back the level of anonymity.

A person can have several levels of anonymity/privacy in parallel—where different people at various echelons of an organization or from various different organizations can (or not) see on their displays different levels of anonymity/privacy at the same time.

In some implementations, a "vault" may store information about one or more particular or groups of users. The vault, for example, may be used to store information about a user that may include, but is not limited to:

a. Last known location;
b. Time of last update;
c. UDID/Device identifier;
d. Nickname or other identifier users may have opted to share;
e. Messages and communications the user initiated or received (e.g., reports, questions, answers, chat, etc.); and
f. Historical information, such as a historical location, will not be stored unless part of an exception (e.g., part of a question or answer).

The vault may be accessible to a personally-identifiable user such that the user can view all or at least important information being stored relevant to the user. For example, the user may access and browse all the information stored about him or her (e.g., from a web or mobile device), with or without logging in to access it. In various implementations, the user may have functions to respond to the information stored within the vault. For example, the user may have the option to approve and/or disapprove the information stored, reset the information stored, such as to a base generic information set, delete the account and corresponding stored information.

The vault can show information that is kept on a user device, on a server, within a blockchain or any combination thereof. The vault can also have information fully encrypted, partially encrypted or not encrypted. Access to the vault may or may not require special credentials. Historical information can be saved on the user device itself and accessed based on direct request, specific events, triggers (e.g., a kidnapping reported in the area), or the like.

In some implementations, a last known location feature also provides enhanced privacy or anonymity. The last known location feature, for example, saves only a last known location (or last given number of known locations). In this manner, historical location information is not stored, nor are routes or other location information collected or stored on the system. The source of the location can be a device itself, such as smartphone, that is equipped with GPS, Wi-Fi, triangulation, beacon location, etc.) to identify a location of the device. Similarly, a location source may include an external location source, such as a beacon or the like.

In various implementations, for example, the following may be provided:

1. Moving in or out of anonymity can be location based, or event based, or preplanned, or a combination including two or more thereof;
2. Changing anonymity settings can be done automatically, manually by user, manually by decision maker (when allowed), trigger based, or based on a combination including two or more thereof;
3. Display of information—Customer/Decision maker may choose, or it may be dictated by customer requirements to display the level of privacy/anonymity on a display/map: the level of privacy/anonymity on the map display—pins, heat-map, zoom in removes users, map quadrants with a density only, etc. or a combination including two or more thereof;
4. Level of Display is dynamic and may be changed—level of the display may be changed Location-based (only this region/polygon shows non-anonymous info), event-based (trigger) based (only when there's an earthquake alert), or manually (if allowed), or a combination including two or more thereof;
5. Customer may have a mixed display at the same time—e.g., some areas show density map while some show individuals. Some show fully anonymized while on campus you see the name of the user;
6. Anonymous level and info do not have to be only on a map—It can be attributed to any type of content. For example, a list of answers—Answer no. 1 is fully anonymous, answer no. 2 comes from a 'Medic expert' and answer no. 3 comes from John Smith;
7. In some implementations, once information is provided, the level of anonymity cannot be altered back—e.g., John answered once totally anonymously and then answered another time Non-anonymously—The anonymous answer will forever remain anonymous. In this case, in the Vault, John will be able to see exactly which are fully anonymous answers and which are not fully anonymous answers;
8. Anonymity as Parameter per question/message—Questions or messages can be defined by the decision maker to be sent as a function of anonymity—for example: Only people fully anonymous will receive this survey, etc. Can be defined manually, automatically, trigger based, or location based or based on a combination including two or more thereof. For example, a survey is sent statewide but people within University or Military campuses can only answer if anonymous;
9. Users of various apps and services can be shown on a single map or display. The level of anonymity can be mixed based on the source of what app they're using. For example: Where a joint user base is used (see, e.g., the '319 patent incorporated herein) and the system shows a campus region. Employees of Company A are shown with full name when they're on campus, while visitors or other employees of other companies are shown fully anonymous or semi-anonymous (e.g., the system identifies them as working for Company X but does not identify them individually); and
10. In various implementations, employees from Company A (e.g., a security officer of Company A) may be able to alert and communicate with them although they are anonymous to Company A employees. Also, a report sent by one of them can trigger an alert to the rest of the people around even if the people have different levels of anonymity or come from different organizations. In the case of an emergency, for example, users/devices may be alerted regardless of anonymity levels.

Further examples of anonymity include the following:

1. Level of anonymity at some point can show contact details or a button/link to reach the individual through other means of communication—Phone, SMS, call, email, Collaboration etc., while maintaining the level of anonymity.
2. Level of anonymity can be time dependent and/or location dependent (i.e. don't show the user's actual name and/or pseudonym at night).
3. Level of anonymity can show a defined random error of location so as to not show exact location.
4. Level of anonymity may be variable at any given moment to different services—for one account a user may be totally anonymous, for another account the user may allow other users or the system to see who the user is (e.g., personally identifiable or pseudo identifiable information).
5. The user can set or preset the level of anonymity shown to one or different accounts in advance.
6. The user can set or preset the level of anonymity shown to one or different accounts ad-hoc before sending each piece of content.
7. The user can set or preset the level of anonymity shown to one or different accounts after fact to make a specific report anonymous in retrospect etc.
8. The user may see an aggregated display of where they are anonymous and where not, the various levels of anonymity at every location and the relevant accounts for which every anonymity setting is relevant.
9. A decision maker can invite one or more user to step out of anonymity—invitation may be received through the app or other channels (SMS, etc.)
10. In some cases the decision maker may query to get more details. For example, if allowed by the user, the user will be notified that such a query has been done, what was provided, time and location etc.
11. The information will be logged in a log that cannot be manipulated (such as but not limited to blockchain) for future reference to who and when and what information was asked for, provided, and by who it was requested.
12. A process may be triggered to be asked automatically in case of an event set as high enough priority (for example, shots are detected, please query the system and let me know everyone who's in the area, has been in the area, or will enter the area in the next TBD time). That request may be generated ad-hoc per triggering event in some implementations.

FIG. 1 is an illustration showing an example view of a display of a selective anonymity system in which areas of the display correspond to anonymous and non-anonymous areas. In the example implementation shown in FIG. 1, the display shows an anonymous area and two non-anonymous areas overlayed on a map. As described herein, various levels of anonymity or privacy of users can be maintained in one or more region while permitting various levels of identification to be maintained in one or more other regions. For example, one or more users located in one or more of anonymous regions may be identified in part or not identified at all within the anonymous region(s) while various levels of identification can be provided for one or more users located within the non-anonymous regions as described herein. The display also includes various communication tools that may be used to communicate with the one or more users in the various region. These communication tools may include, for example, Alert, Message, Instruct, Ask, Survey, or other communication methods that allow for communication with one or more users without compromising the various anonymity levels. An individual, such as a user or system administrator, or the system itself may communicate with one or more users in an anonymous region via a communication tool, such as Alert, to push a warning or other message to user without providing the sender with identification information related to the user located in the anonymous region. Other tools, such as the Message, Instruct, Ask, or Survey tools, may be similarly used to communicate with the users in the anonymous regions without eliminating privacy. The tools may also be used to communicate with the user(s) located in one or more non-anonymous regions. In this manner, various users, administrators, and/or the system may be able to communicate within the variety of privacy related rules of the system.

Figure 2:
FIG. 2 is an illustration showing examples of levels of anonymity that may be used within a system of selective anonymity.
Figure 2:
Figure 2:
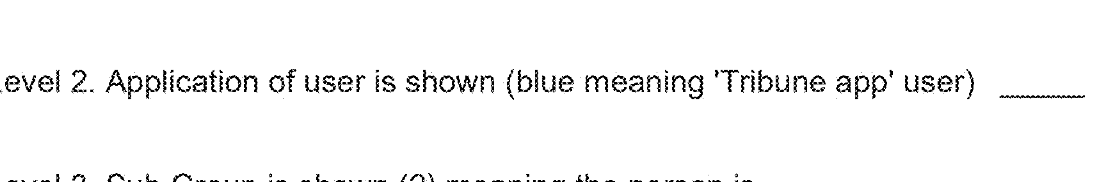
Figure 2:
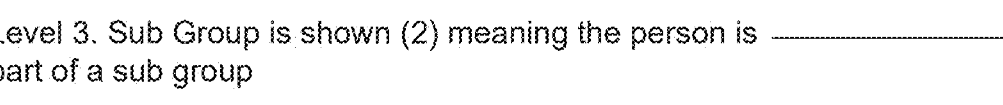
Figure 2:
Figure 2:
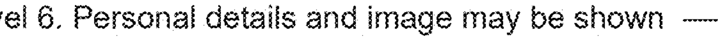
Figure 2:

FIG. 2 is an illustration showing examples of levels of anonymity that may be used within a system of selective anonymity. In this implementation, six example levels of anonymity are shown. In a first level of anonymity, for example, a user may be kept totally anonymous, such as when the user is located outside of a non-anonymous region. In this manner, communication may be permitted without any identification of the user. Broadcasts such as safety alerts, warnings, informative communications, or the like may be permitted to any one or more user while maintaining complete privacy of the recipient user(s).

In a second level of anonymity, an application associated with a user may be shown while maintaining other identifying information of the user. In this manner an application, advertiser associated with the application or the like, may be able to identify users of that application by location without providing the application/associated parties any additional information related to the one or more users of that application. For example, a publisher may be able to identify or target one or more users as a user of the application (e.g., by location, general location, etc.) without accessing any personally identifiable information relating to the user(s).

In a third level of anonymity, one or more user(s) may be further identifiable as part of a sub-group of a group of users. An application, for example, may be able to identify a user as part of a sub-group of its users, such as but not limited to for ad targeting, without being able to access any other personally identifiable information for the user(s).

In a fourth level of anonymity, one or more criteria related to user(s), such as but not limited to expertise, knowledge, proficiency, may be shown without providing any further personally identifiable information. Again, the various levels of anonymity may still allow certain activities by the system or other users while still maintaining one or more level of personal privacy as described herein.

In a fifth level of anonymity, a nickname, avatar, username, or other pseudo privacy maintaining identifiers may be allowed while protecting more invasive personally identifiable information. In this manner, users may be able to provide anonymizing identifiers that can be identified, seen, or tracked while maintaining a relative level of privacy from disclosure.

In a sixth level of anonymity, full personal information, images, or the like may be accessible by the system or one or more other users.

The levels of anonymity shown with respect to FIG. 2 are merely examples. Further, location identifiers related to those users may be shown on the map or other location identifying display such as shown in FIG. 2. Similar to FIG. 1, one or more communication tools may be used to communicate with one or more users while maintaining the various levels of privacy/anonymity with respect to various users.

The individual users may opt one or more of the various levels of anonymity to be shown in the system. Thus, the system may be adapted to permit different users of the system to be displayed or identified with differing levels of anonymity/privacy. Further, the different levels of anonymity may be able to be selected within differing locations (e.g., within different regions or areas). For example, while in a first location, such as a place of employment, a user may allow their employer to track them with no privacy or relatively little privacy. While in another public location, such as a market or amusement park, a user may allow some middle level of privacy such as to allow a proprietor to provide them discounts or other useful information (e.g., targeted information) while maintaining a desired level of privacy. In yet another location such as on their own private property, the user may choose to maintain total anonymity such that the user and location cannot be identified at all.

Figure 3:
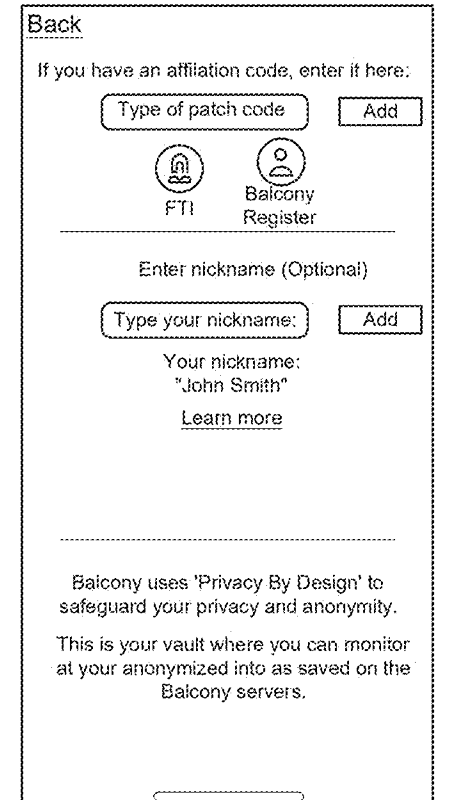
FIG. 3 is an illustration showing an example anonymity management interface for an individual mobile user.

FIG. 3 is an illustration showing an example anonymity management application interface for an individual mobile user. In this example, the application interface may provide an opt in affiliation or tagging code. The user may opt into a service in any number of ways. The user may provide a code (such as shown in the example of FIG. 3), make a selection, scan an image (e.g., a barcode or QR code), or opt in any other manner. The application interface may further allow the user to provide a nickname, avatar, username, or other pseudo privacy maintaining identifier that may be used to associate with the user while maintaining some level of anonymity. FIG. 3 further shows an interface through which the user may be able to access (e.g., edit and/or view) one or more privacy related settings maintained by an application for that user. In the example shown in FIG. 3, for example, the user has an option to access a "Vault" or other repository showing privacy related information that may be associated with a user. The user may merely be able to view the information and opt in or out and/or may be able to edit one or more privacy related settings.

Figure 4:
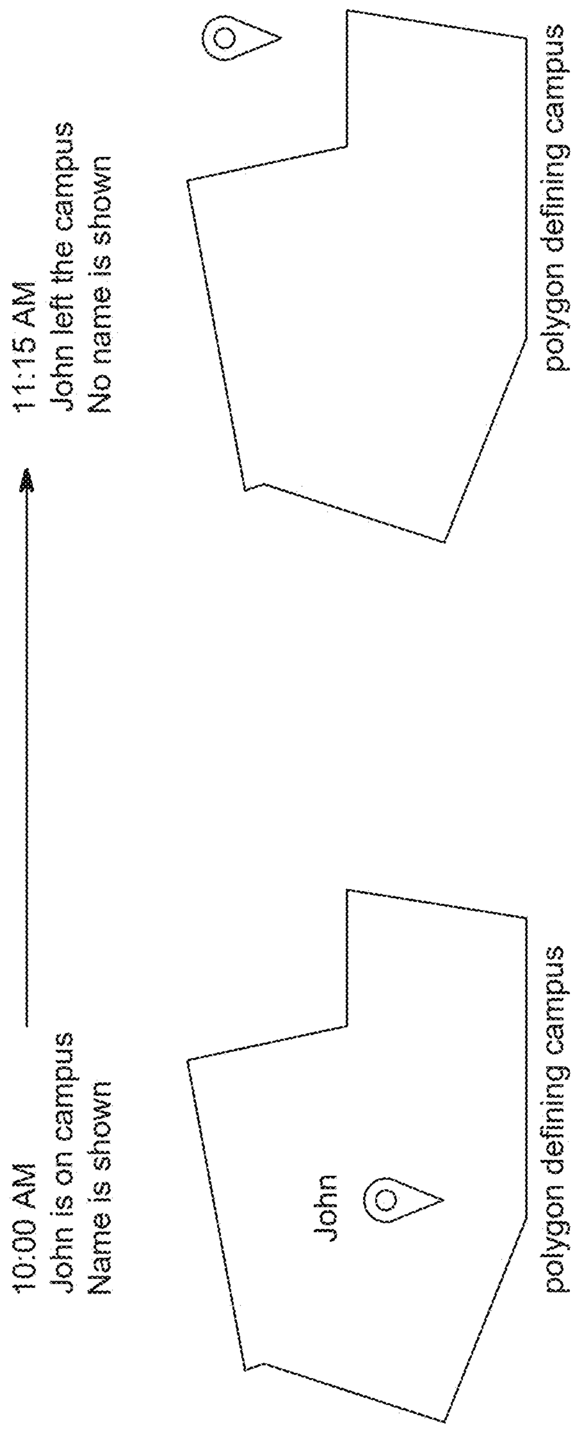
FIG. 4 shows an example display showing identification of a user "John" depending on his location with respect to a region.

FIG. 4 shows an example display showing identification of a user "John" depending on his location with respect to a region. In the example shown in FIG. 4, a location is shown as a polygon and is identified in this example as a campus (e.g., work or school location) that is capable of identifying various levels of anonymity depending on the user's location within the system. In this example, "John" is located within the polygon identifying location at a first time 10:00 AM, but outside the polygon identifying location at a second time 11:15 AM. During the first time in which the user is located within the polygon region, the user is identified by the nickname "John" or in some other relatively less anonymous manner. The location of the user may further be identified in a more certain manner (e.g., precisely or within a predetermined region corresponding to an actual location) while within the polygon, while identified in a generic manner (or not at all) outside the polygon. In FIG. 4, for example, a generic location identifier just showing an unidentified user as being located outside the polygon may be used.

Figure 5:
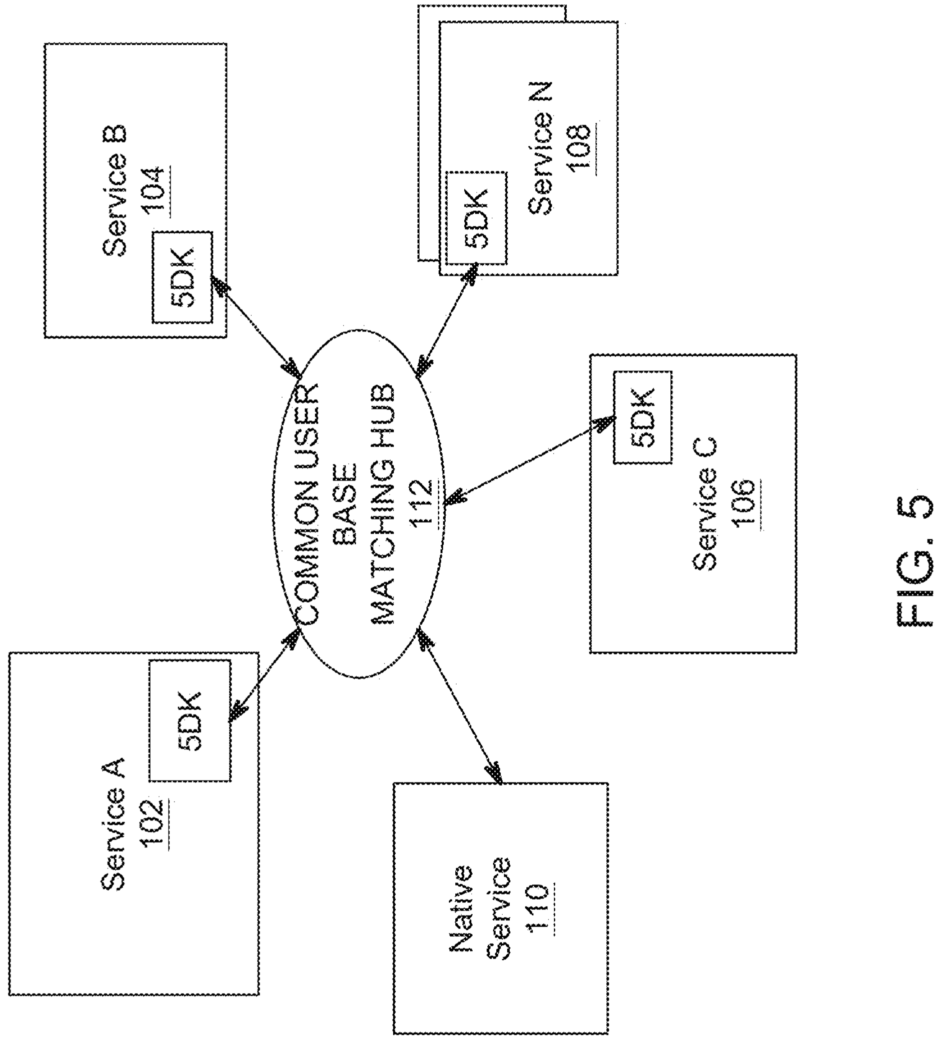
FIG. 5 shows an example implementation of a system for requesting and retrieving location-based information from computing devices of other users associated with a location, according to one or more implementations shown and described herein. In this embodiment, an anonymity preserving system may operate in conjunction with a plurality of different services or applications.

FIG. 5 shows an example implementation of a system for requesting and retrieving location-based information from computing devices of other users associated with a location, according to one or more implementations shown and described herein. In this embodiment, an anonymity preserving system may operate in conjunction with a plurality of different services or applications. In this manner, a user may be able to manage their privacy settings across a plurality of different services or applications. The user, for example, may be able to provide custom settings for each service or application or may provide commons settings for two or more individual services or applications.

FIG. 5 shows an example implementation of a system 100 for requesting and retrieving location-based information from computing devices of users (e.g., users familiar with a location, at the location and/or within a predefined perimeter of the location). In the implementation of FIG. 5, for example, the system includes a plurality of distinct (e.g., 3$^{rd}$ party) services that each contribute to a common-user-base location-based platform. In this particular implementation, for example, the system includes a plurality of distinct services (Service A 102, Service B 104, Service C 106, . . . , Service N 108 and Native Service 110) in which aggregated and updated locations of mobile computing devices and, thus users, are integrated into one or more databases (e.g., a cloud-based database) via a common user base matching hub 112 that may be adapted to match user privacy or anonymity settings for the various services. The individual mobile computing devices correspond to one or more users from the plurality of distinct services 102, 104, 106, 108, 110. By having the users from different eco-systems connected to a common user base/database, each service can leverage users and mobile computing devices associated with other distinct services. In this implementation, the services 102, 104, 106, 108 each include Software Development Kit (SDK) integration into the service. Other forms of integration such as but not limited to Application Programming Interfaces (APIs), widgets and other forms of integration are also contemplated. As an example, a user from one service may ask a question about a specific location and a user from another service that is matched at that location may answer the requesting user In one implementation, the common user location platform provides data query and analysis tools adapted to extract tangible and effective information out of the common, integrated database.

Further, specialized mobile computing devices optimized for real-time or near real-time location-based functionality may be provided to one or more users of the system. Dedicated chip-sets for mobile computing devices, for example, may be optimized for location-based functionality. The specialized mobile computing devices, for example, may provide enhanced location accuracy (e.g., using aggregated sensor output such as GPS, WIFI mapping, altitude, temperature, barometric, noise and other sensors), optimized real-time and near-real time video streaming (e.g., including 2G/3G/4G/5G environments), improved energy management and battery optimization, a dedicated sensor collection for passive or active location data sharing, using information from other applications on board the device to improve accuracy and/or lower energy consumption. By leveraging indoor navigation functionality (e.g., using beacon infrastructure, magnetic indoor navigation, etc.) in addition to outdoor navigation functionality, a widespread, unique database of actual indoor and outdoor inventory locations (e.g., the precise location of one or more products within one or more retail locations in a geographic area), and identification of advertising opportunities can be increased.

In one particular implementation, a sponsored response may be provided where a location based request is directed to a particular business or location (e.g., a local business district). In this manner, the request may be matched to one or more sponsor users for providing response to the location-based request. A sponsor, such as business owner in a particular location, may be provided with a direct and straight forward communication channel subject to individual anonymity and/or privacy selections between a sponsor computing device and a mobile computing device of a user interested in a location at or near the sponsor location (near referring to a predefined perimeter around the location and predefined may be either by the user or by the system or by any other means and may change and be updated over time). The location-based system provides an ability for the sponsor to responds in real-time or near-real-time to such queries or requests through a dedicated response channel.

Figure 6:
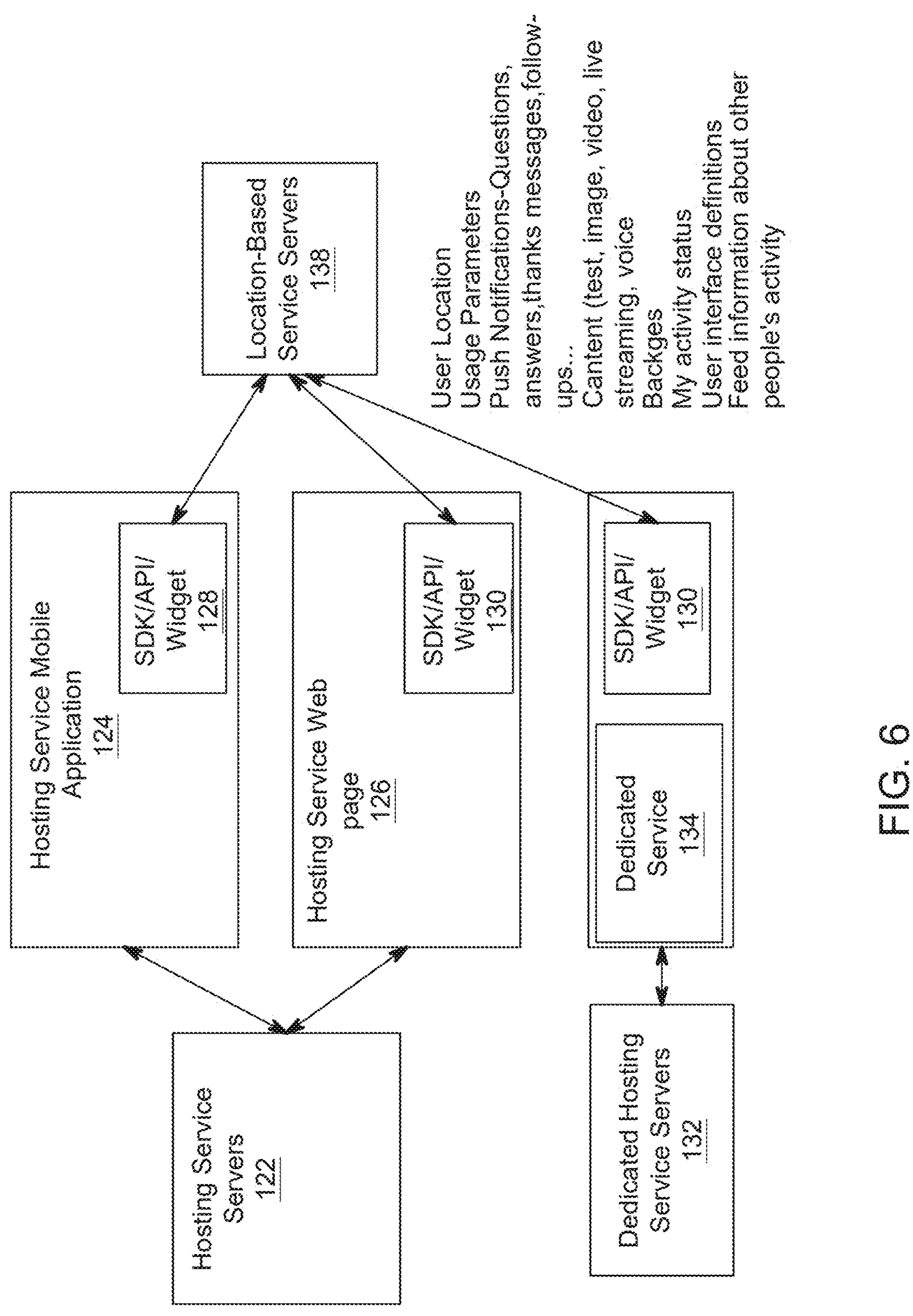
FIG. 6 shows a block diagram of an example integration scheme 120 in which a location-based service is integrated in one or more services 122, such as the services shown in FIG. 5.

FIG. 6 shows a block diagram of an example integration scheme 120 in which a location-based service is integrated in one or more services 122, such as the services shown in FIG. 5. Each service 102, 104, 106, 108, for example, may include one or more methods of integration, such as via a Mobile Application Hosting Service 124 and/or a Web Page Hosting Service that integrates the location-based service via an SDK, API, widget or other form of integration. Although SDK, API and widget forms of integration are shown, each service can include one or more methods of integration of the location-based service. In the particular implementation shown in FIG. 6, for example, a hosting service includes one or more hosting servers 122 that hosts a Mobile Application Hosting Service 124 and a Web Page Hosting Service 126. Each of the services 124 and 126 include location-based service integration via an SDK/API/widget 128 and 130, respectively. The integration components 128, 130 communicate with Location-Based Service Servers 138, such as to communicate location-based requests and responses as well as other communications. The Location-Based Service Server 138, for example, may provide a common user base matching hub and other services, such as shown in FIG. 5. Communications between the services and the Location-Based Service Servers 138, for example, may include communications such as, but not limited to the following: User Location, Usage Parameters, Push Notifications—Questions, answers, thanks messages, follow-ups, Content (text, image, video, live streaming, voice), Badges, User activity status, User interface definitions, Feed information about other people's activity, and other communications. The term Web, for example, may refer to supporting any type of connected device, such as but not limited to mobile, desktop, tablet, smart TV, wearable device, or the like.

In one example implementation, an algorithm includes software configured for executing on a processor of a computing device. For example, the algorithm can build a user-location map through which the systems and processes can keep track of relevant users at a given time. The user-location map may show a rough order of magnitude of the location of the users in order to reduce the frequency of users locations updated and thus reduce battery usage within portable computing devices of users. Thus, by knowing roughly where a user is by only asking where the exact location is when relevant (relevant, for example, may mean when there is a question in a pre-defined perimeter described as 'near the user,' when the user enters an area of current high or historical activity), the battery life can be preserved versus following a user device continuously. The locations may be determined and stored in any number of formats using any number of location information, such as latitude, longitude, altitude, motion status, location source identifiers, accuracy information, data-link quality, update information, geo-tagging information and the like. Updates may be recurring at regular or irregular intervals, determined in response to a user "checking in" to tell the system where they are, based on location changes, altitude changes, changes in connections (e.g., changes in Wifi connections), connection to a beacon (via bluetooth or other), using another app sharing the location, entrance to areas predefined as areas of high or low interest so as to predefine the frequency of updates or the like. Relevancy may be determined based on various information, such as movement (e.g., average movement where the device is likely with an owner, no movement where the phone is likely not with an owner, fast motion such as where the device and user are in a car or other transport and thus the location might be considered irrelevant for location-based searches, profile, type of service (Eco system) through which you are connected etc.)

Figure 7:
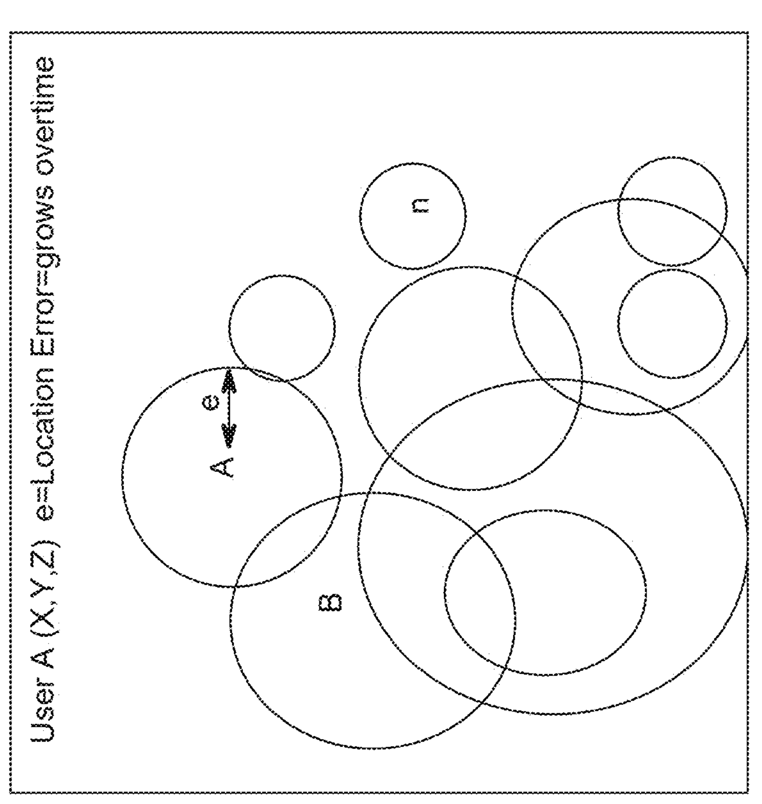
FIG. 7 shows example operations of an example process of determining a rough order of magnitude of the user locations based on a determination of locations over time.

FIG. 7 shows example operations of an example process of determining a rough order of magnitude of the user locations based on a determination of locations over time. As time passes since the last location received from a computing device associated with a user, an error "e" associated with the location will increase until a new location is received from the computing device associated with that user. Similar errors associated with computing devices associated with users B, . . . , N are also shown. As described above, the locations provided by the computing devices associated with users may be updated by the device itself (e.g., based on activities related to the device such as every X minutes, connecting to WIFI, entering a geo-fence, roaming, etc.) or related to an external trigger (e.g., a request to update the location of the device from a server or other system component).

Example

An example of an implementation of a system and/or method to communicate based on location with privacy and/or anonymity features/settings. In one example, a combination of two or more elements may be used to enhance privacy and anonymity of users:

1. Selective anonymity—based on location and various events, a person can be anonymous or not, with various degrees of anonymity in between.
2. Vault (repository)—All information is saved in a vault that can be accessed by the user to see, reset, or delete all info about them that is saved on the system.
3. Last know location—We keep and communicate based on Last known location only. We do not save historical info or track a route of a person.

An example approach includes the following:

1. A polygon (or other region) is defined on the map by a decision maker or stake holder (for example: A corporate campus).
2. Users have a mobile device with selective anonymity on it.
3. The users can provide any private info they want or a nickname/avatar which is saved:
   a. On the device itself,
   b. Or on the server.
4. When they are outside of the polygon they are anonymous, which means:
   a. No one can see them on the map, or
   b. They are shown as part of a heat map, or
   c. They are shown as part of a Density map (or any other type of map), or
   d. They are shown as a dot/icon.
5. When the user(s) are out of the region (e.g., polygon) other users, the system and/or administrators don't see them, don't know who they are, we cannot communicate with them, are limited in one or more functionalities, and/or some users or administrators may not see them because they don't have access/permission, while some others do.
6. Once they enter the region/polygon, information about them is revealed to the decision maker or others looking at or having access to the map:
   a. Name
   b. Special Icon
   c. Proficiency/Specialty/Special status (sick person for example)
   d. Specific status relevant at that moment
7. Examples:
   a. For a school app, children are shown as children with their name tag on the map as long as they're on a school campus. Once they're out they become totally anonymous.
   b. Same thing for an amusement park—when you're inside a perimeter of the park, many features are available for users, including messaging and ads. Once the users are out of the polygon/perimeter, the user status is switched (either manually or automatically) to ex visitor with a different set of data provided.
   c. Security personnel working for a company. When they're on campus the officers can see who they are on the map and communicate with them. When they're out of campus they're a dot within the large user base or they're not even seen on the map.
8. Level of anonymity can be controlled by an admin, or by the users themselves.
9. The user can decide to step out of anonymity at any moment (opt in functionality).
10. The level of anonymity can be a function of events—Thus auto triggered by an event in the area (bombing immediately get all medics out of anonymity in a specific radius.
11. Could be a function of an external triggers for example earthquake centered triggering an emergency event.
12. Step out of anonymity could be automatic (Walked into the Polygon) or semi auto—The user is prompted to step out of anonymity.
13. The polygon can be time sensitive, i.e., User only steps out of anonymity during day hours. For example, at night, even if the user walks by his or her office, the user may remain anonymous.
14. Anonymity can have multiple levels:
   a. No one knows where you are.
   b. Only the system knows where you are, but you're not shown on the map (i.e. a user can ask on a building and people there will receive the Question although the user does not see anyone on the map/interface.
   c. Some or all people with access can see a dot/icon or other indicator on the map but do not know who it is.
   d. Basic information is shown: Proficiency, organization, etc. though no name or specific information.
   e. Avatar and or other pseudo anonymous indicator is shown.
   f. Name is shown on a dot/icon.
   g. Image is shown.
15. Map display:
   a. Level of anonymity can be defined as function of the zoom of the map. User can see a medic in a relatively large area (e.g., within a city, neighborhood, etc.) but when the user zooms in over a certain level the medic is gone or the display turns into a 'density map' to ensure the user does not know the building the medic lives or their precise location.

b. Can be defined as function of number of people—If you're the only the person in town on the system, you'll stay totally anonymous. Once there are above a predetermined threshold [e.g., a set number or geographical density] more info can be shared with the user.

16. Where is the information stored?

a. Can be saved on the phone with no record on the servers.

b. Can be saved in the server but with limited access to humans and the display as above.

c. Can be on the server temporarily until you walk out of the polygon, in which case the information can be deleted.

d. Can be on both device and Servers with a sync mechanism.

e. Can be on a server.

f. The information can be stored using blockchain technology or other secure format.

17. Communication with the user:

a. All the process of stepping in and out of anonymity is totally transparent to the user.

b. The user can see via Icon that they're anonymous or not at that moment.

c. The user receives a push message when stepping in and/or out of anonymity.

d. The user can choose to stay in or out of anonymity.

e. A timer gives the user the option not to step out of anonymity (User walked into a non-anonymous area—if you don't tap here within the next 10 sec, your identity will be unveiled.)

18. Who can see the identity/info? One or more of the following:

a. Only contacts of the users.

b. Only the organization of the user.

c. Their direct management.

d. Decision makers in the organization.

e. Any type of entity.

f. Marketing add companies.

g. The public.

19. Example triggers

Repository/Vault:

1. Shows all info the system has About you, including but not limited to:

a. Last known location b. Time of last update c. UDID/Device identifier d. Nickname and other identifiers the user opted to share e. Messages and comms the user initiated or received (reports, questions, answers, chat, etc.)

f. Historical information will never be saved unless part of a question or answer (your historical location for example)

2. Actions a. The user can see and browse all info from a web or mobile device.

b. No need to log in to see it c. May have the following functions: (i) accept information stored, (ii) reset information stored, and (iii) delete this account.

3. The vault can show info that is kept on the device, on the server, within a blockchain or not, or any combination of the above.

4. The Vault can have the information fully encrypted, partially encrypted, or not encrypted.

5. Access to the vault can be done without special credentials.

6. Historical location information can be saved on the device itself and accessed based on direct request, specific events or triggers (someone reported a kidnapping in your area)

Last Known Location:

1. The system allows to save last known location only.

2. The source of the location can be the phone itself (via GPS, Wi-Fi, Triangulation, Beacon location etc.).

3. The source can be an external device (beacon, etc.)

Exemplary Computing System

Figure 8:
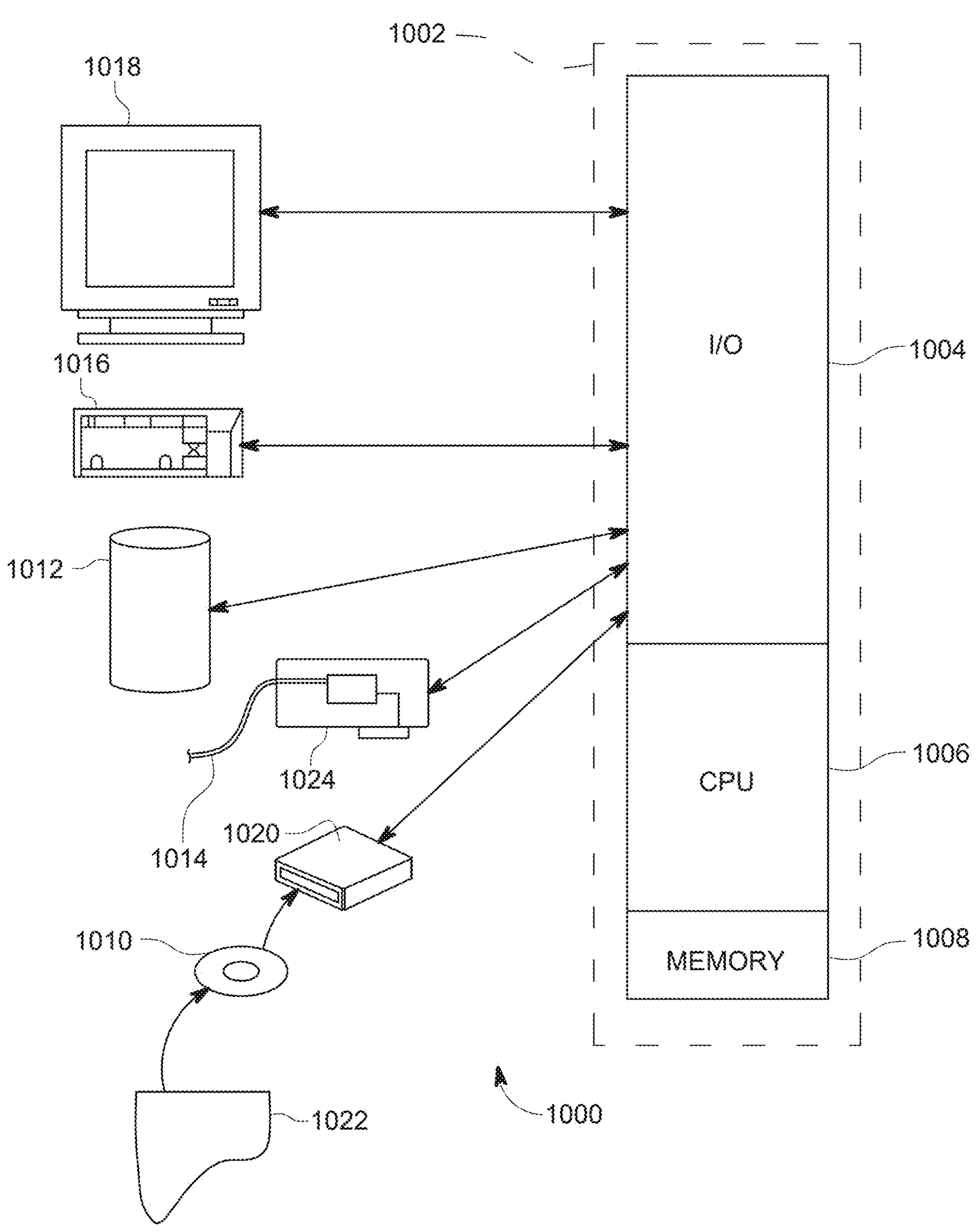
FIG. 8 is a schematic diagram of a computing device 1000 upon which a location based information retrieval system may be implemented.

FIG. 8 is a schematic diagram of a computing device 1000 upon which a location based information retrieval system may be implemented. As discussed herein, implementations include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

FIG. 8 illustrates an exemplary system useful in implementations of the described technology. A general purpose computer system 1000 is capable of executing a computer program product to execute a computer process. Data and program files may be input to the computer system 1000, which reads the files and executes the programs therein. Some of the elements of a general purpose computer system 1000 are shown in FIG. 1 wherein a processor 1002 is shown having an input/output (I/O) section 1004, a Central Processing Unit (CPU) 1006, and a memory section 1008. There may be one or more processors 1002, such that the processor 1002 of the computer system 1000 comprises a single central-processing unit 1006, or a plurality of processing units, commonly referred to as a parallel processing environment. The computer system 1000 may be a conventional computer, a distributed computer, or any other type of computer. The described technology is optionally implemented in software devices loaded in memory 1008, stored on a configured DVD/CD-ROM 1010 or storage unit 1012, and/or communicated via a wired or wireless network link 1014 on a carrier signal, thereby transforming the computer system 1000 in FIG. 12 into a special purpose machine for implementing the described operations.

The I/O section 1004 is connected to one or more user-interface devices (e.g., a keyboard 1016 and a display unit 1018), a disk storage unit 1012, and a disk drive unit 1020. Generally, in contemporary systems, the disk drive unit 1020 is a DVD/CD-ROM drive unit capable of reading the DVD/CD-ROM medium 1010, which typically contains programs and data 1022. Computer program products containing mechanisms to effectuate the systems and methods in accordance with the described technology may reside in the memory section 1008, on a disk storage unit 1012, or on the DVD/CD-ROM medium 1010 of such a system 1000. Alternatively, a disk drive unit 1020 may be replaced or supplemented by a floppy drive unit, a tape drive unit, or other storage medium drive unit. The network adapter 1024 is capable of connecting the computer system to a network via the network link 1014, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 1000 is connected (by wired connection or wirelessly) to a local network through the network interface or adapter 1024, which is one type of communications device. When used in a WAN-networking environment, the computer system 1000 typically includes a modem, a network adapter, or any other type of communications device for establishing communications over the wide area network. In a networked environment, program modules depicted relative to the computer system 1000 or portions thereof, may be stored in a remote memory storage device. It is appreciated that the network connections shown are exemplary and other means of and communications devices for establishing a communications link between the computers may be used.

In accordance with an implementation, software instructions and data directed toward operating the subsystems may reside on the disk storage unit 1012, disk drive unit 1020 or other storage medium units coupled to the computer system. Said software instructions may also be executed by CPU 1006.

The implementations described herein are implemented as logical steps in one or more computer systems. The logical operations are implemented (1) as a sequence of processor-implemented steps executing in one or more computer systems and (2) as interconnected machine or circuit modules within one or more computer systems. The implementation is a matter of choice, dependent on the performance requirements of a particular computer system. Accordingly, the logical operations making up the embodiments and/or implementations described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products. One implementation of a computer program product provides a transitory or non-transitory computer program storage medium readable by a computer system and encoding a computer program.

Furthermore, certain operations in the methods described above must naturally precede others for the described method to function as described. However, the described methods are not limited to the order of operations described if such order sequence does not alter the functionality of the method. That is, it is recognized that some operations may be performed before or after other operations without departing from the scope and spirit of the claims.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A process for providing selective location-based anonymity capabilities across a plurality of distinct services, the process comprising:

using at least one processor coupled with at least one memory to:

receive location-based information associated with a mobile device;

analyze the location-based information using a processor, wherein the operation of analyzing includes identifying a location associated with the information and determining at least one anonymity setting to associate with the information, wherein the at least one anonymity setting is retrieved from a common user base associated with the first service and a second service independent from the first service; and provide an indication of the location based on the at least one anonymity setting, wherein the operation providing an indication comprises utilizing the at least anonymity setting to at least partially obscure information associated with a user of the mobile device.

2. The process of claim 1, wherein the information comprises at least one of personally identifiable information and an actual location associated with the mobile device.

3. The process of claim 1 wherein the location-based information comprises information generated from at least one of a GPS, beacon, RFID, Wi-Fi, triangulation, altitude information, barometric information.

4. The process of claim 1 wherein the anonymity setting is at least one of the group comprising: temporally based and location based.

5. The process of claim 1 wherein the anonymity setting comprises a plurality of anonymity levels.

6. The process of claim 1 wherein the anonymity setting comprises providing pseudo anonymity information.

7. The process of claim 1 wherein the common user base is at least one of user-accessible and user modifiable.

8. The process of claim 1 wherein a limited number of locations are stored for the user.

9. The process of claim 1 wherein relative levels of anonymity vary based on whether the location is within a region or external to that region.

10. The process of claim 1 wherein the anonymity setting provides a rough order of magnitude of the user location.

11. A system adapted to provide selective location-based anonymity capabilities across a plurality of distinct services, the system comprising:

a receiving computing system comprising at least one processor coupled with at least one memory configured to:

receive location-based information associated with a mobile device associated with a first service;

analyze the location-based information using a processor, wherein the operation of analyzing includes identifying a location associated with the information and determining at least one anonymity setting to associate with the information, wherein the at least one anonymity setting is retrieved from a common user base associated with the first service and a second service independent from the first service; and provide an indication of the location based on the at least one anonymity setting, wherein the computing system is adapted to provide an indication comprises utilizing the at least anonymity setting to at least partially obscure information associated with a user of the mobile device.

12. The system of claim 11, wherein the information comprises at least one of personally identifiable information and an actual location associated with the user of the mobile device.

13. The system of claim 11, wherein the location-based information comprises information generated from at least one of a GPS, beacon, RFID, Wi-Fi, triangulation, altitude information, barometric information.

14. The system of claim 11, wherein the anonymity setting is at least one of the group comprising: temporally based and location based.

15. The system of claim 11, wherein the anonymity setting comprises a plurality of anonymity levels.

16. The system of claim 11, wherein the anonymity setting comprises providing pseudo anonymity information.

17. The system of claim 11, wherein the common user base is at least one of user-accessible and user modifiable.

18. The system of claim 11, wherein a limited number of locations are stored for the user.

19. The system of claim 11, wherein relative levels of anonymity vary based on whether the location is within a region or external to that region.

20. The system of claim 11, wherein the anonymity setting provides a rough order of magnitude of the user location.

* * * * *